(12) United States Patent
Richardson et al.

(10) Patent No.: US 8,862,523 B2
(45) Date of Patent: Oct. 14, 2014

(54) RELATIONAL LEARNING FOR SYSTEM IMITATION

(75) Inventors: Matthew Richardson, Seattle, WA (US); Aniruddh Nath, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 173 days.

(21) Appl. No.: 13/363,398

(22) Filed: Feb. 1, 2012

(65) Prior Publication Data

US 2013/0110747 A1    May 2, 2013

Related U.S. Application Data

(60) Provisional application No. 61/552,460, filed on Oct. 28, 2011.

(51) Int. Cl.
| | | |
|---|---|---|
| *G06N 5/00* | (2006.01) | |
| *G06F 1/00* | (2006.01) | |
| *G06N 99/00* | (2010.01) | |
| *A63F 3/02* | (2006.01) | |

(52) U.S. Cl.
CPC ............. *G06N 99/005* (2013.01); *A63F 3/022* (2013.01)
USPC ............................... 706/12; 709/217; 704/270

(58) Field of Classification Search
USPC ......................................................... 706/12
See application file for complete search history.

(56) References Cited

U.S. PATENT DOCUMENTS

| | | | |
|---|---|---|---|
| 2009/0281972 A1 | 11/2009 | Shahani et al. | |
| 2010/0222924 A1* | 9/2010 | Gienger et al. ............... | 700/246 |
| 2010/0278420 A1* | 11/2010 | Shet et al. ..................... | 382/156 |
| 2011/0191277 A1* | 8/2011 | Ag ndez Dominguez et al. ............ | 706/12 |
| 2012/0031113 A1* | 2/2012 | Tsuyuki ............................ | 62/66 |

OTHER PUBLICATIONS

Bombini, et al., "Relational Learning by Imitation", Retrieved at <<http://www.di.uniba.it/~ndm/publications/files/bombini09amsta.pdf>> in the proceedings of KES-AMSTA '09 Proceedings of the Third KES International Symposium on Agent and Multi-Agent Systems: Technologies and Applications, Jun. 3-5, 2009, pp. 273-282.

Floyd, et al., "Creation of DEVS Models using Imitation Learning", Retrieved at <<http://cell-devs.sce.carleton.ca/publications/2010/FW10/Michael_Floyd.pdf>> in the proceedings of Proceedings of 2010 Summer Simulation Conference (SummerSim10), SCSC Symposium, Jul. 2007, pp. 334-341.

Gudla, et al., "Learning Imitation Strategies using Cost-Based Policy Mapping and Task Rewards", Retrieved at <<http://ranger.uta.edu/~huber/papers/IASTED04GudlaS.pdf>> : in Proceedings of the 6th IASTED International Conference on Intelligent Systems and Control, Aug. 23-25, 2004, pp. 1-6.

(Continued)

*Primary Examiner* — Jeffrey A Gaffin
*Assistant Examiner* — Kalpana Bharadwaj
(74) *Attorney, Agent, or Firm* — Cassandra Swain; Judy Yee; Micky Minhas

(57) ABSTRACT

Technologies pertaining to learning a computer-executable imitation system that imitates behavior of an existing computer-executable system are described herein. Behavior of an existing computer-executable system can be monitored through monitoring data input to the existing computer-executable system and data output by the existing computer-executable system responsive to receipt of the input data. An imitation system that imitates the behavior of the existing system can be learned, wherein the imitation system comprises a relational model.

20 Claims, 9 Drawing Sheets

(56) References Cited

OTHER PUBLICATIONS

Zhang, et al., "Playing Tetris Using Learning by Imitation", Retrieved at <<http://www.informatik.uni-freiburg.de/~ki/papers/zhang-cai-nebel-gameon10.pdf>> Nov. 17-9, 2010., pp. 5.

Guenter, et al., "Using Reinforcement Learning to Adapt an Imitation Task", Retrieved at <<http://lasa.epfl.ch/publications/uploadedFiles/IROS07.pdf>> in the proceedings of Intelligent Robots and Systems, Oct. 29, 2007, pp. 1022-1027.

Moldovan, et al., "Statistical Relational Learning of Object Affordances for Robotic Manipulation", Retrieved at http://ilp11.doc.ic.ac.uk/short_papers/ilp2011_submission_27.pdf>> Proceedings of 21st International Conference on Inductive Logic Programming, Jul. 31, 2011, pp. 1-6.

Natarajan, et al., "Imitation Learning in Relational Domains: A Functional-Gradient Boosting Approach", Retrieved at <<http://ijcai.org/papers11/Papers/IJCAI11-239.pdf>> Proceedings of the Twenty-Second International Joint Conference on Artificial Intelligence, Jul. 16, 2011, pp. 1414-1420.

Milch, et al., "Lifted Probabilistic Inference with Counting Formulas", Retrieved at <<http://people.csail.mit.edu/milch/papers/aaai08cfove.pdf>> Proceedings of the 23rd AAAI Conference on Artificial Intelligence, Jul. 13, 2008, pp. 1062-1608.

\* cited by examiner

CLEAR THE LEFT SIX FROM THE BOTTOM ROW, THE BOTTOM SIX FROM THE FAR-RIGHT COLUMN, THE RIGHT SIX FROM THE TOP ROW, THE TOP SIX FROM THE LEFT COLUMN, THE SECOND ROW, THE SECOND TO BOTTOM ROW, THE SECOND FROM THE LEFT COLUMN AND THE SECOND FROM THE RIGHT COLUMN, THE TOP SIX FROM COLUMNS THREE AND FOUR, THE TOP TWO ROWS OF SIX, THE TWO COLUMNS OF SIX, THEN THE REMAINING 2 ROWS

FIG. 3

CLEAR THE LEFT SIX FROM THE BOTTOM ROW, THE BOTTOM SIX FROM THE FAR RIGHT COLUMN, THE RIGHT SIX FROM THE TOP ROW, THE TOP SIX FROM THE LEFT COLUMN, THE SECOND ROW, THE SECOND TO BOTTOM ROW, THE SECOND FROM THE LEFT COLUMN AND THE SECOND FROM THE RIGHT COLUMN, THE TOP SIX FROM COLUMNS THREE AND FOUR, THE TOP TWO ROWS OF SIX, THE TWO COLUMNS OF SIX, THEN THE REMAINING 2 ROWS

FIG. 4

RELATIONAL LEARNING FOR SYSTEM IMITATION

CROSS-REFERENCE TO RELATED APPLICATION

This application claims priority to U.S. Provisional Patent Application No. 61/552,460, filed on Oct. 28, 2011, and entitled "RELATIONAL LEARNING FOR SYSTEM IMITATION", the entirety of which is incorporated herein by reference.

BACKGROUND

Computer-executable systems have been built to undertake actions in a particular domain. Pursuant to an example, computer-executable systems have been developed that receive instructions in a particular language (e.g., English), interpret such instructions, and then intelligently perform some action as a function of the received instructions. Oftentimes, such computer-executable systems are learned in an automated fashion through utilization of machine-learning technologies. For instance, one or more machine learning algorithms can be provided with instructions for performing a task or collection of tasks, and can further be provided with a format for such instructions. In accordance with a particular example, in the game of chess, an instruction may be to "move the queen from position g5 to a second position g1." The format for such instruction can also be provided (the movement of the queen from g5 to g1 on the chess board). The learner then produces a learned mapping that is employed in a system for interpreting chess instructions, such that, desirably, if the instruction "move the king from position c1 to position c2" is received by the system, the system can understand that the king is desirably moved from c1 to c2, even if the system has not received such instruction previously.

The example set forth above pertains to gameplay. It is to be understood, however, that in a broader context, systems have been trained to automatically and intelligently perform various types of functions. Such systems include but are not limited to speech recognition systems, navigation systems, control systems, recommender systems, classification systems, etc.

In certain situations, reinforcement learning techniques can be employed in connection with training the system. In reinforcement learning, feedback is given to the system, such that the system can understand if an output result was desirable or undesirable. For instance, continuing with an example pertaining to chess, the system can be provided with policies or randomly choose policies for gameplay. At the end of the game, the system can be provided with information indicating whether the system won or lost a game of chess, and based on that feedback can refine the policies for gameplay.

Due to the training data employed, the policies employed, or the like, the system may be brittle, over-specified, require extra input information, or have other negative characteristics. For instance, overfitting is a common concern in the field of machine learning, where output of a system describes random error or noise rather than an appropriate underlying relationship.

SUMMARY

The following is a brief summary of subject matter that is described in greater detail herein. This summary is not intended to be limiting as to the scope of the claims.

Described herein are various technologies pertaining to generating an imitation system, wherein the imitation system comprises a learned relational model. With more particularity, behavior of an existing computer-executable system is monitored. In other words, output of the existing computer-executable system is monitored relative to its corresponding inputs. The imitation system is automatically learned to reproduce the input-output characteristics of the existing computer-executable system, wherein such imitation system is learned solely through monitoring behavior of the existing system and generalizing the behavior of the computer-executable system. To generate the imitation system, an internal model of the existing system is built. In accordance with an exemplary embodiment disclosed herein, the internal model of the existing system that is built when generating the imitation system is a relational model.

A relational model includes items as well as relationships between items. Relational machine learning is a relatively new area of machine learning, where relationships (either defined or learned) are represented in a relational model. More specifically, relationships between items that inference is desirably performed upon are considered and represented in a relational model. Relational models can be contrasted from propositional models, such as neural networks, decision trees, Bayesian networks, and the like, as propositional models fail to contemplate relationships between items. Exemplary relational models that can be included in the imitation system comprise Markov Logic Networks (MLNs), probabilistic relational models, BLOG relational models, a structural logistic regression relational model, a relational dependency network, a probabilistic entity relationship model, etc.

Two types of learning can be undertaken when learning the relational model: structure learning and parameter learning. Structure learning refers to learning that relationships exist between two items in the relational model; parameter learning refers to learning weights that are to be assigned to such relationships to cause an output of the imitation system to best mimic the existing computer-executable system.

Other aspects will be appreciated upon reading and understanding the attached figures and description.

BRIEF DESCRIPTION OF THE DRAWINGS

FIGS. 3-5 illustrate an exemplary game and corresponding instructions, wherein input/output behavior of a system that is learned to interpret instructions for winning the game are monitored in connection with learning an imitation system.

DETAILED DESCRIPTION

Figure 1:
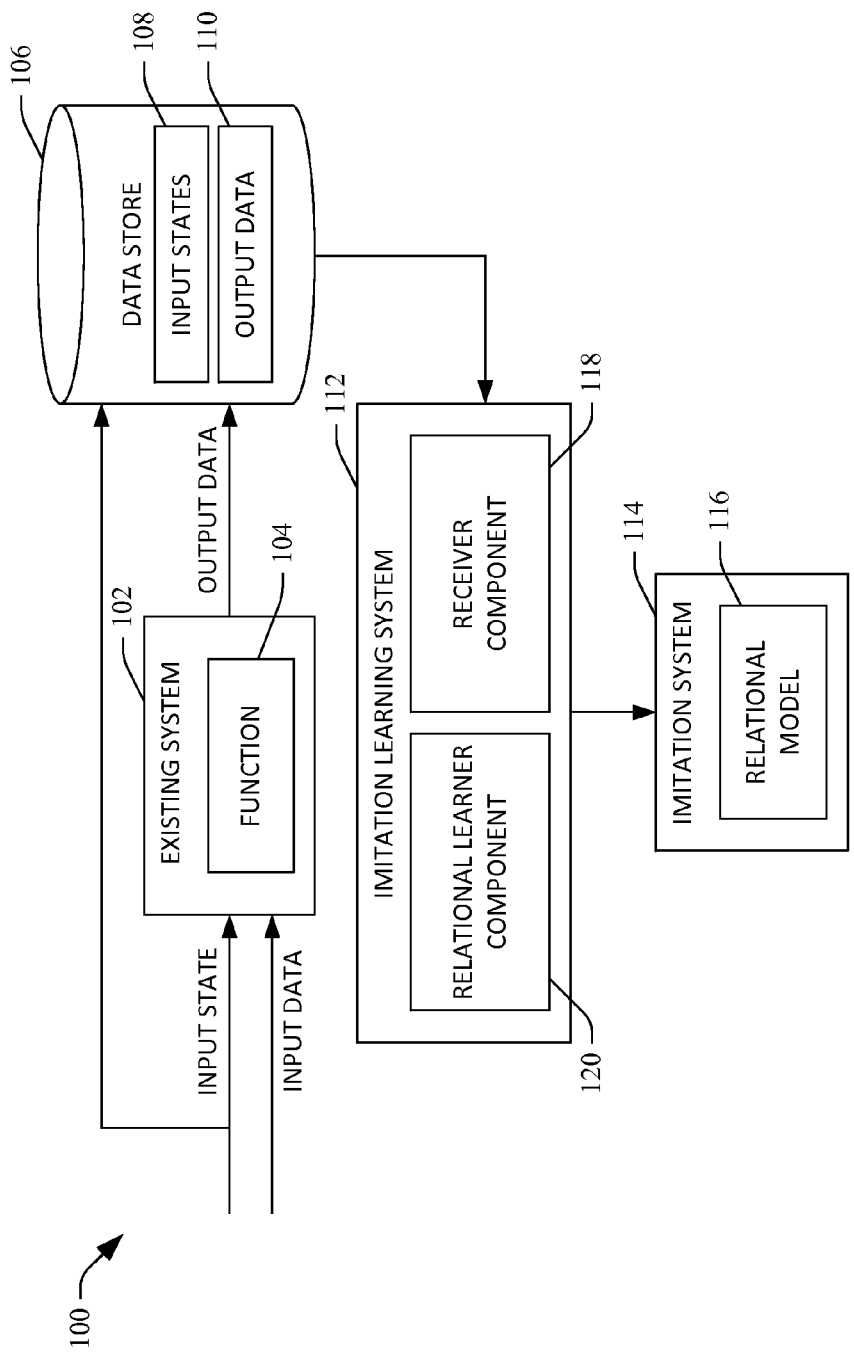
FIG. 1 is a functional block diagram of an exemplary system that facilitates generating an imitation system that comprises a relational model.

Various technologies pertaining to generating an imitation system that comprises a learned relational model will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference to FIG. 1, an exemplary system 100 that facilitates learning an imitation system that comprises a relational model is illustrated. The system 100 includes an existing system 102. In an exemplary embodiment, the existing system 102 can be a computer-executable system that comprises at least one computer-executable function 104 that receives input state(s) of the system 100 and optionally other input data and generates output data based upon the input state(s) and the input data. In another exemplary embodiment, the existing system 102 may be a human being that is desirably the subject of imitation. In still yet another exemplary embodiment, the existing system 102 can be an environment that is desirably the subject of imitation. Thus, the existing system 102 can be any suitable type of system that is configured to perform some action (generate output data) as a function of the input state(s) and the input data. If the existing system 102 is a computer-executable system, the function 104 can be one or more manually constructed rules, a function learned through reinforcement learning, or any other suitable function. Thus, the existing system 102 may comprise an agent that is learned by way of reinforcement learning. The existing system 102 may include numerous functions that operate in conjunction to generate the output data responsive to receipt of the input state(s) and the input data. It is to be understood that the behavior of the existing system 102 is observable, such that input state(s) of the existing system 102 can be monitored and the output of the system 102 can be monitored.

The system 100 further comprises a data store 106 that receives and retains input states 108 of the existing system 102 and output data 108 output by the existing system 102. An imitation learning system 112 is configured to receive the input states 108 and the output data 110 from the data store 106 and generate an imitation system 114, wherein the imitation system 114 comprises a relational model 116. The relational model 116 may include, for example, atoms and relationships, wherein atoms comprise first-order atomic logic functions, and relationships are implemented as first order weighted clauses. Therefore, in an example, an atom can be a statement about a thing or things, such as "X is a man", "Y is the daughter of X", "Z is married to X", etc. The relational model 116 may be or include a Markov Logic Network, a probabilistic relational model, a BLOG relational model, a structural logistic regression relational model, a relational dependency network, and/or a probabilistic entity relationship model. Other relational models are also contemplated and are intended to fall under the scope of the hereto-appended claims.

Pursuant to a particular example, the relational model 116 may be or include a Markov Logic Network, which includes first order logic clauses that have weights assigned thereto, wherein the clauses capture general dependencies in a domain covered by the Markov Logic Network and a weight is indicative of importance that a dependency captured by the clause should hold. In operation, the Markov Logic Network can be used to infer probabilities about relationships among entities. For instance, a Markov Logic Network can model interactions between people in a company and be configured to predict a probability that any given pair of people is in a manager/subordinate relationship. Markov Logic Networks are generally described in the following publication, the entirety of which is incorporated herein by reference: Richardson, M. and Domingos, P. "Markov Logic Networks" Machine Learning, 62, pp 107-136.

As mentioned above, the imitation learning system 112 can be configured to monitor behavior of the existing system 102, and can learn the imitation system 114 based upon the input/output characteristics of the existing system 102. The imitation system 114, subsequent to being learned by the imitation learning system 112, can behave similarly to the existing system 102 with respect to the input states 108 and the output data 110. The imitation system 114, however, may behave more generally with respect to new input states, such that the imitation system 114 may better handle new situations (with less complications caused by overfitting) when compared to the existing system 102. This may at least be partially due to the imitation system 114 not requiring the additional input data; that is, it may require less input data than the existing system 102.

In connection with learning the imitation system 114, the imitation learning system 112 can include a receiver component 118 that receives the input states 108 and the output data 110. The imitation learning system 112 further comprises a relational learner component 120 that learns the imitation system 114 based upon the input states 108 and the output data 110. As will be described in further detail below, Markov Logic can be employed by the relational learner component 120 to learn the imitation system 114. In an exemplary embodiment, the Markov Logic can be modified to contemplate numerical relations, such that relationships/items can be summed and/or related.

Additional detail pertaining to the learning of the imitation system 114 is now provided. Basically, it may be desirable to reproduce the input-output characteristics of the existing system 102 solely by observing how the existing system 102 behaves, and attempting to learn a system that copies/generalizes such behavior. In order to accomplish this goal, an internal model of the inner workings of the existing system 102 is generated by the imitation learning system 112.

The advantage of a relational model is that such a model can learn more complex functions as compared to propositional models, and also learn much more compact functions (as long as the target domain is relational in nature as well). For instance, with respect to the game of chess: in a relational domain, a rule such as the following may be desired: "if the queen is 2 squares above and 2 squares to the left of the rook, then move the queen to the right one square". Using a propositional model, the following would be specified: "If the queen is in position (1,1) and the rook is in position (3,3) then move queen to (2,1)"; "If the queen is in position (1,2) and the rook is in position (3,4) then move the queen to (2,2)"; and so on for every possible combination of positions on the board.

From the above, it can be discerned that relational representations of concepts, and thus, relational models, can be more compact than propositional representations of concepts, and thus, propositional models.

The relational learner component 120 can undertake two kinds of learning when learning the relational model 116: structure learning and parameter learning. The structure learning is learning the atoms that have been described above, such as "friends(x,y)=>friends(y,x)" (x is a friend of y implies that y is a friend of x) or "Smokes(x)=>Unhealthy(x)" (x smokes cigarettes implies that x is unhealthy). The parameter learning is computing the weights for those formulas that make the relational model 116 fit the input states 108 and the output data 110. In an exemplary embodiment, the relational learner component 120 can undertake both structure and parameter learning to learn the relational model 116 that can imitate the existing system 102. Further, it is contemplated that other (extra) data can be employed to train the imitation system 114. In an exemplary embodiment, the imitation system 114 can be trained to imitate behavior of the existing system 102, and can further be trained utilizing other data, such as unlabeled examples, input/output states of some other system, or the like.

In an exemplary embodiment, reinforcement learning can be employed to learn the existing system 102. Thereafter, the imitation learning system 112 can be employed to learn the imitation system 114, which is a relational version of the existing system 102 learned with the reinforcement learning. In such an embodiment, the slower learning stage (structure learning) can occur at the end of the learning process, rather than throughout the entire reinforcement learning process. Also, this approach can handle domains in which actions have probabilistic outcomes (e.g., the system says to move a block from A to B, and the block may or may not actually make it to B).

In yet another exemplary embodiment, the imitation learning system 112 can be employed to imitate an unknown existing system. For instance, a computer-executable system can be designed to interpret instructions for a game, and then act in accordance with the interpreted instructions (a game walkthrough). The imitation learning system 112 can be employed to observe the behavior of the existing system 102 to learn the imitation system 114, which when learned, can know how to play the game without the walkthrough. The imitation system 114, in certain situations, may perform better than the existing system 102, even when the existing system 102 has the walkthrough. This can be explained, as the imitation system 114 can learn general game rules and strategy. Thus, with reference to a game that has hard-to-interpret instructions, the imitation system 114 may be able to play the game well whereas the existing system 102 may perform sub-optimally. Thus, the imitation system 114 may learn generalizations and strategies, thereby possibly removing need for inputs required by the existing system 102.

In another exemplary embodiment, rather than imitating a trained system, the existing system 102 can be employed to generate random output data, and desirable output data can be retained in the output data 110 while undesirable output data can be discarded. Additionally, the input states 108 are states of the existing system 102 that correspond to the desired output data 110. The imitation learning system 112 can be employed to learn the imitation system 114, such that the imitation system 114 imitates the behavior of the existing system 102 only when the output data is desirable. Accordingly, imitation learning does not need the existing system 102 to be an intelligent system—rather, positive examples of desirable behavior (even if output randomly) can be utilized to learn the imitation system 114. Such an approach can be employed to improve a poorly-performing existing system by generating a new system (the imitation system 114) that is modeled after behavior of the existing system 102 that is desirable.

As mentioned previously, in an exemplary embodiment, the relational learning component 120 can employ Markov Logic in connection with learning the imitation system 114. Further, Markov Logic can be modified to contemplate "counting formulas". Markov logic is a representation that can represent both logic and probability. For example, Markov Logic can be employed to generate the following statements:

$w_1$: Friends(x,y) and Friends(y,z) implies Friends(x,z).
This statement means that if x is friends with y, and y is friends with z, then x is friends with z. However, this statement may not be 100% true; accordingly, weights that are indicative of probabilities can be attached to such statements through the weight $w_1$.

Existing Markov Logic language has some limitations, including the lack of a notion of "counting". For instance, the following statement may desirably be represented in Markov Logic: "if x is friends with at least 5 smokers, then x is likely to smoke". This can be represented as follows:

$w_2$: $\#_y$(Friends(x,y) and Smokes(y))>5 implies Smokes(x)
Other operators that can be represented in the extended Markov Logic language include <, >, =, a constant value, addition, subtraction, multiplication, and the like. Thus, the extended Markov Logic language includes arbitrary mathematical expressions that involve counts among predicates in atoms (e.g., "Friends" in the example set forth above). Subsequent to the extended Markov Logic language being employed to represent learned statements, such logic can be mapped into a Markov Network, and Markov Network inference can be performed over such Markov Network.

An exemplary implementation of the system 100 is now provided. While such implementation is described in the context of a game, it is to be understood that the system 100 is not limited to games. Rather, the system 100 can be employed in connection with the learning of an imitation system that imitates behavior of any suitable system that can operate in a relational domain. The existing system 102 can be configured to receive sets of instructions in human-readable language (e.g., written in plain English), wherein each set of instructions is a walkthrough describing how to pass a level of the game. During training for the existing system 102, desired output can be provided, such that the existing system 102 can learn mappings between the sets of instructions and actual gameplay.

The imitation learning system 112 can monitor the behavior of the existing system 102 as the existing system 102 performs the walkthrough for the game, wherein the input states 108 are the respective states of the game prior to the existing system 102 taking action and the output data 110 is output of the existing system 102 corresponding to the input states. The resulting imitation system 114 learned by the imitation learning system 112 produces similar behavior with respect to the input states 108 and the output data 110, but does so in a generalized manner; rather than being able to follow instructions, the imitation system 114 has been learned to play the game. In other words, the imitation learning system 112 monitors the behavior of the existing system 102, wherein the behavior is passing levels in the game (through interpretation of instructions on how to pass the levels). The resulting imitation system 114 imitates behavior of the existing system 102, but does not need instructions; in contrast, the imitation system 114 can learn game strategies to pass the levels. Accordingly, while the behavior of the existing system 102 and the imitation system 114 is similar, the manner of accomplishing the behavior is markedly different.

Figure 2:
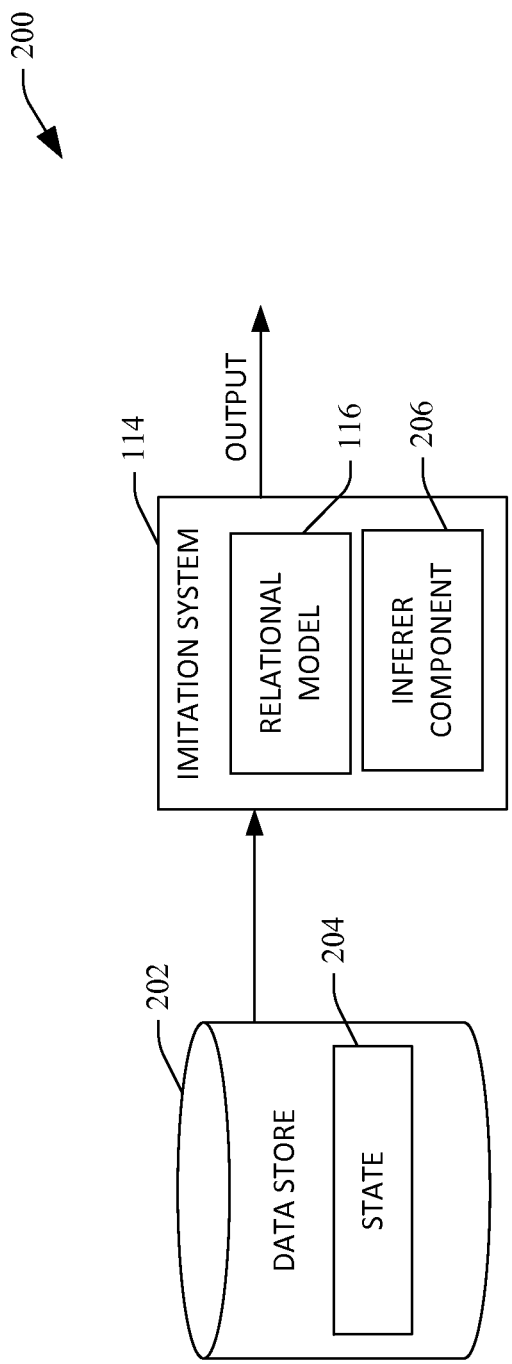
FIG. 2 is a functional block diagram of an exemplary system that facilitates utilizing a relational model in connection with imitating a pre-existing computer-executable system.

Turning now to FIG. 2, an exemplary system 200 that facilitates responding to a state of an environment/system is illustrated. The system 200 comprises a data store 202 that includes an observed state 204 of a system and/or environment, wherein the system/environment is desirably manipulated and/or is desirably the cause of some action. In an example, the data store 202 can be memory that is in communication with a sensor, such that the data store 202 at least temporarily retains the observed state 204 until such observed state 204 can be read from the data store 202. In another exemplary embodiment, the observed state 204 can be a current state of a system that is desirably manipulated.

The system 200 further includes the imitation system 114, which, as described above, has been learned to imitate desirable input/output behavior of the existing system 102. The imitation system 114 comprises the learned relational model 116. The imitation system 114 further comprises an inferer component 206 that receives the observed state 204 and performs inference over the relational model 116 to generate probabilistic output data. As noted above, the relational model 116 may be a Markov Logic Network, and the inferer component 206 can perform Markov Logic inference over the relational model 116 to generate the output data. In an exemplary embodiment, the output data may then be retained as a subsequent observed state, or the observed state 204 can be a function of the output data.

Figure 5:
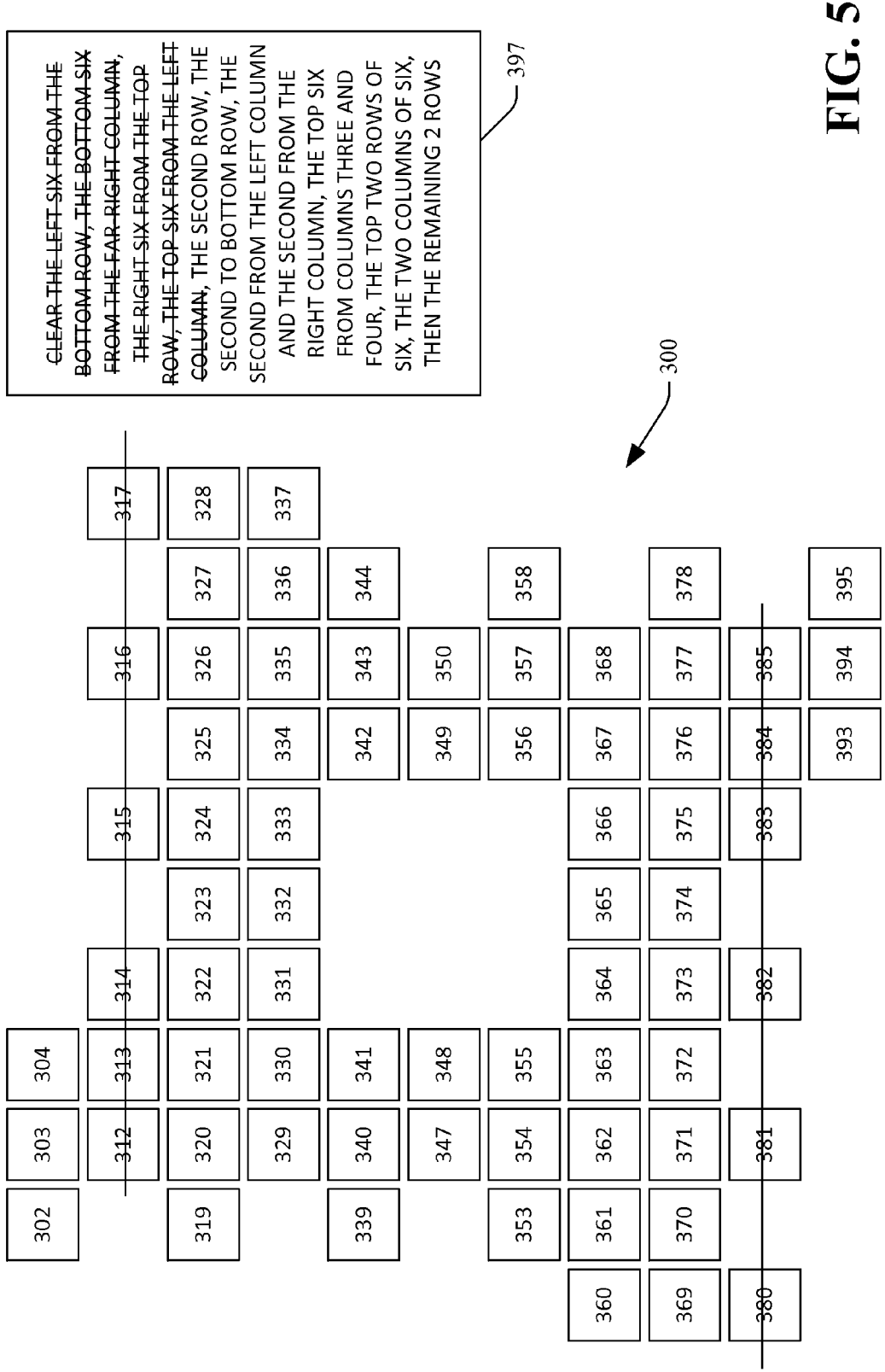

Now referring to FIGS. 3-5, an exemplary game 300 wherein a system that undertakes actions relative to a logical game is shown. The game 300 is referred to as "crossblock", wherein the goal of the game is to repeatedly remove a particular number of adjacent blocks (either horizontally or vertically) until all blocks have been removed. In the game shown in FIGS. 3-5, six adjacent blocks are to be removed at one time (and repeatedly) until all blocks have been removed. If a player is unable to remove six adjacent blocks, and not all the blocks have been removed, then the player has not completed the game. Oftentimes with games such as the one shown in FIGS. 3-5, people have generated instructions for beating a game or a certain level, wherein such instructions are typically referred to as walkthroughs. Thus, if a player properly interprets and follows the instructions, then the player should be able to beat the game/pass the level.

Pursuant to an example, the existing system 102 can be trained to interpret human-generated instructions and execute actions responsive to interpreting the instructions. For example, the game can include various levels with blocks organized differently, and the existing system 102 can be trained by analyzing actions undertaken by a human game player with respect to instructions for some particular number of games. When training is completed, the existing system 102 can be provided with never-before seen instructions relative to a never-before seen game board, and can interact with the game board via interpreting the instructions.

With respect to the game 300 as shown in FIG. 3, such game 300 includes blocks 301-396, and rules of the game require that six adjacent blocks be removed at one time. The system 300 can be provided with instructions 397, and the system 300 can automatically act via interpreting the instructions. For instance, the instructions 397 can include the first statement of "clear the left six from the bottom row". If the existing system 102 interprets the instructions properly, the system 300 will remove blocks 387-392. The next statement in the instructions 397 is "clear . . . the bottom six from the far-right column". Therefore, the existing system 102 can remove blocks 345, 351, 359, 379, 386, and 396.

Referring to FIG. 4, the game 300 is updated to illustrate that certain blocks have been removed. Continuing with the example set forth above, the next instruction is to "clear . . . the right six from the top row", followed by "clear . . . the top six from the left column". The existing system 102, if properly interpreting the instructions 397, will subsequently remove blocks 305-310, and will thereafter remove blocks 301, 311, 318, 338, 346, and 352.

Now turning to FIG. 5, the game 300 is updated to illustrate that the existing system 102 has followed the above-mentioned instructions. The existing system 102 continues to follow the instructions 397, as it can interpret the next instruction to "clear . . . the second row", and subsequently remove the blocks 312-317. The existing system 102 then interprets the instruction "clear . . . the second to bottom row", and subsequently removes blocks 380-385. Additional following of instructions is not shown for sake of brevity. In this example, it is clear that the existing system 102 has been trained to interpret and follow textual instructions with respect to the game 300.

As noted above, the imitation learning system 112 can learn the imitation system 114 by monitoring input/output behavior of the existing system 102. In this example, an input state is the state of the game 300 prior to the existing system 102 interpreting an instruction, and the output data is the state of the game 300 subsequent to the existing system 102 interpreting the instruction. The imitation learning system 112 can learn the imitation system 114, however, without regard to the instructions themselves; accordingly, the imitation system 114 can learn rules/strategies to play the game 300, rather than learning how to interpret human-generated instructions. For example, the imitation learning system 112, with respect to the game 300, can learn the following strategy: it is desirable to remove an entire row or, alternatively, less than half of the row. This can be expressed in the form of first-order logic, and can be included as a formula in the relational model 116. In some situations, the existing system 102 may improperly interpret instructions; in such cases, the input/output characteristics of the existing system 102 can be ignored. Thus, the imitation learning system 112 can learn the imitation system 114 such that the imitation system 114 imitates only desirable behavior of the existing system 102. Pursuant to another example, the existing system 102 may be a system that randomly plays the game 300 or similar levels (many, many times). The occurrences when the existing system 102 actually wins the game 300 can be labeled as desirable occurrences, and the input states 108 and the output data 110 for such desirable occurrences can be provided to the imitation learning system 112, which can in turn learn the imitation system 114 that mimics desirable behavior of the existing system 102.

Further, the game 300 illustrates an exemplary situation where expressing a count in a formula included in a Markov Logic Network may be desirable. For instance, it may be desirable to learn the following strategy with respect to the game 300: "if there are only six blocks remaining in a row, clear the entire row". In conventional Markov Logic language, this must be expressed as a combination of six separate predicates; e.g., "if there is a block at x, y, and x+1, y, and x+2, y, etc., then clear the row". As mentioned above, the Markov Logic can be extended to express counts in formulas, allowing for representation of summations of predicates in formulas included in a Markov Logic Network. Continuing with the example rule set forth above, such rule can be expressed in an atomic formula in the relational model 116 via counting blocks in a row, such that if the count=6, then the row should be cleared. The Markov Logic can be further extended to contemplate relations between predicates (e.g., whether a value corresponding to a first predicate is greater than, less than, or equal to a second predicate), addition between values, insertion of constants, subtraction between values, multiplication, division, and the like.

Figure 6:
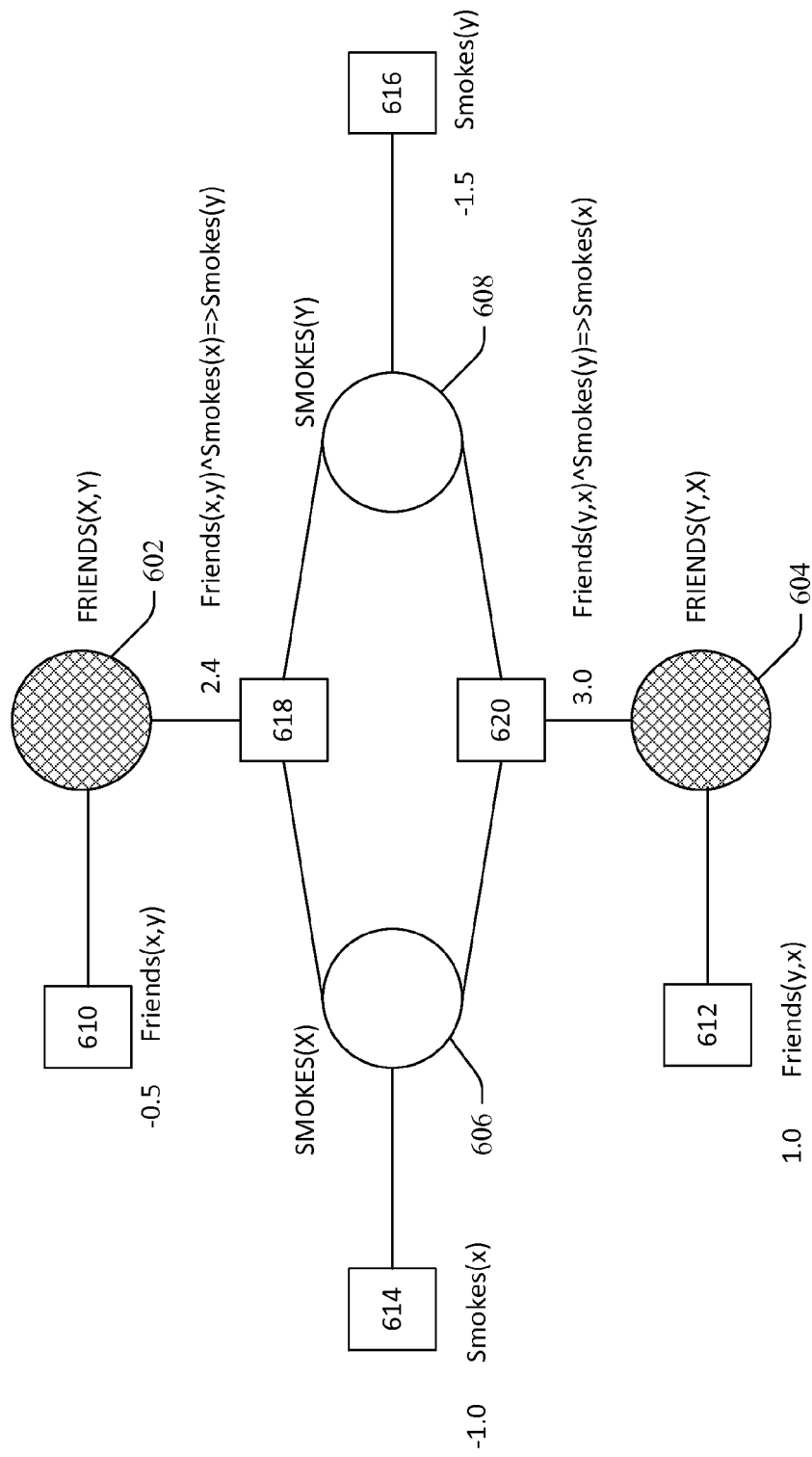
FIG. 6 illustrates an exemplary Markov Logic Network

Now referring to FIG. 6, an exemplary Markov Logic Network 600 is shown in graphical form. The Markov Logic Network 600 comprises a plurality of predicates 602-608. The predicate 602 represents the statement "X is friends with Y", the predicate 604 represents the statement "Y is friends with X", the predicate 606 represents the statement "X smokes", and the predicate 608 represents the statement "Y smokes". Each of these predicates has some respective weight (learned) that corresponds thereto, wherein the weight can be indicative of probability of the statements being true. For instance, there can be a prior probability that X smokes, a prior probability that X is friends with Y, etc. These predicates, when grounded, are referred to as atoms in Markov Logic Networks. "Formula" that can be learned via Markov Logic inference refers to first-order logic formulas (such as "X smokes" or "Smokes (X) implies Smokes (Y)." The formula corresponding to the predicates 602-608 are shown in the Markov Logic Network 600 as atoms 610-616, respectively.

The Markov Logic Network 600 can also include formulas that contemplate combinations of predicates. For instance, the Markov Logic Network 600 can comprise formulas 618 and 620, which represent the statements "X and Y are friends and X is a smoker, therefore Y is a smoker" and "Y and X are friends and Y is a smoker, therefore X is a smoker", respectively. The learning of the formulae is structured learning, while the learning of the corresponding weights is parameter learning.

Figure 7:
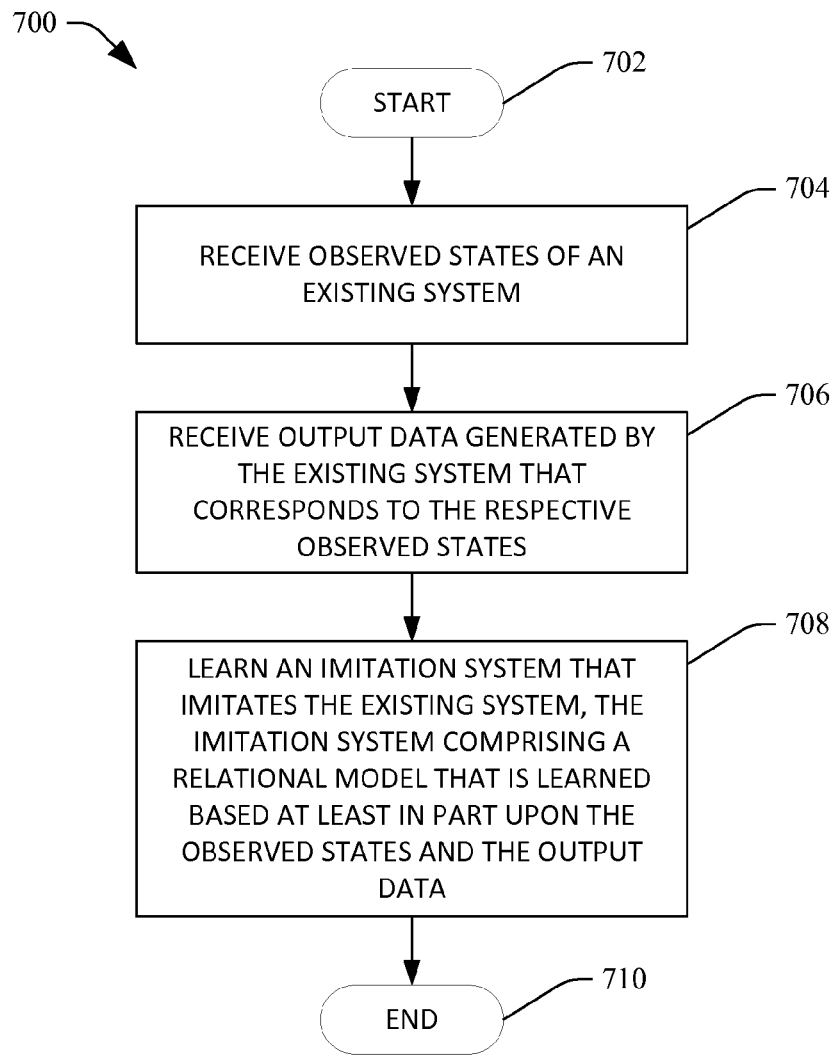
FIG. 7 is a flow diagram that illustrates an exemplary methodology for learning an imitation system that comprises a relational model.
Figure 8:
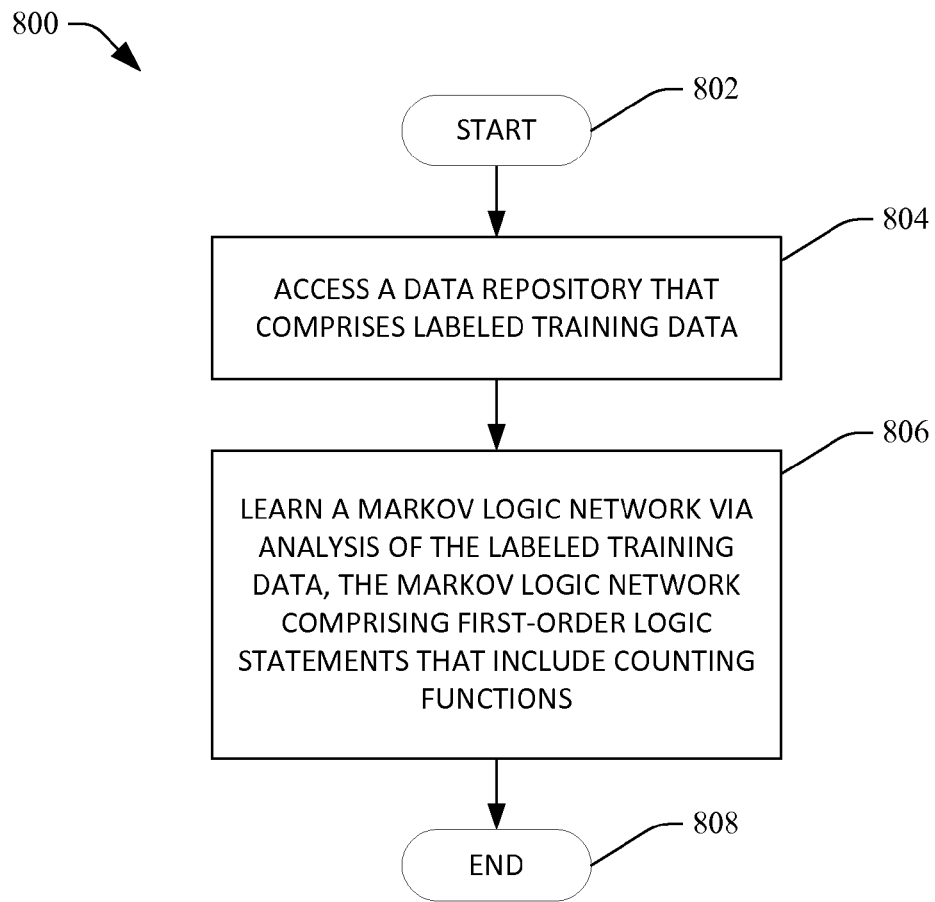
FIG. 8 is a flow diagram that illustrates an exemplary methodology for including mathematic expressions in Markov Logic to contemplate counting of values corresponding to predicates.

With reference now to FIGS. 7 and 8, exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Referring now to FIG. 7, an exemplary methodology 700 that facilitates learning an imitation system that imitates behavior of an existing system is illustrated. The methodology 700 begins at 702, and at 704, observed input states for an existing system are received. At 706, output data generated by the existing system that corresponds to the input states is received. Thus, behavior of the existing system can be ascertained by monitoring input/output data characteristics for the existing system. At 708, an imitation system that imitates the behavior of the existing system is learned. As described above, the imitation system can include a relational model that is learned based at least in part upon the behavior of the existing system (the observed states and the output data). The methodology 700 completes at 710.

Turning now to FIG. 8, an exemplary methodology 800 that facilitates inclusion of counting in Markov Logic is illustrated. The methodology 800 starts at 802, and at 804 a data repository is accessed that comprises training data. In an example, the training data can comprise input/output behavior of an existing system, although the training data is not so limited. At 806, a Markov Logic Network is learned via analyzing the labeled training data. The Markov Logic Network comprises first-order logic statements that include counting functions, such that values of predicates can be summed, related, etc. The methodology 800 completes at 808.

Figure 9:
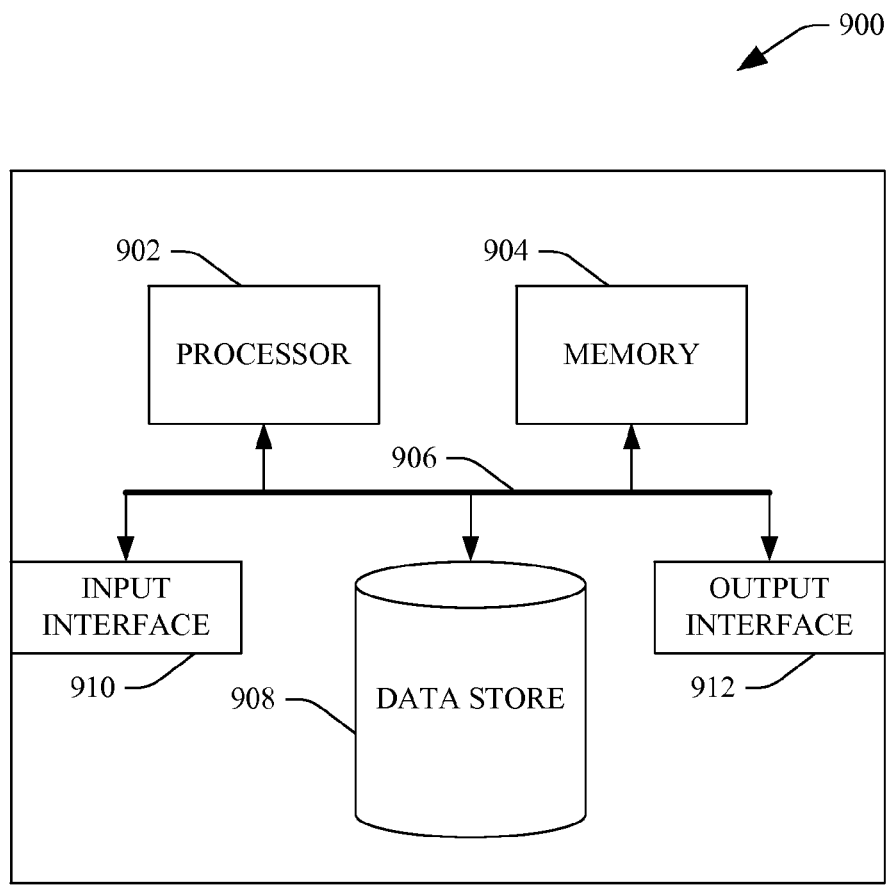
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports learning a computer-executable system that imitates behavior of an existing system is illustrated. In another example, at least a portion of the computing device 900 may be used in a system that supports utilizing extended Markov Logic language to learn a relational model. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store input data, output data, etc.

The computing device 900 additionally includes a data store 908 that is accessible by the processor 902 by way of the system bus 906. The data store may be or include any suitable computer-readable storage, including a hard disk, memory, etc. The data store 908 may include executable instructions, input data, output data, etc. The computing device 900 also includes an input interface 910 that allows external devices to communicate with the computing device 900. For instance, the input interface 910 may be used to receive instructions from an external computer device, a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. An imitation learning system, comprising:
 a receiver component that receives:
  observed states of an existing system; and
  output data, the output data being data output by the existing system, the output data corresponding to respective observed states of the existing system; and
 a relational learner component that learns an imitation system based at least in part upon the observed states of the existing system and the output data corresponding to the respective observed states, the imitation system learned to imitate behavior of the existing system, the imitation system comprising a relational model, the relational model comprising atoms that represent entities and edges that represent relationships between the entities.

2. The imitation learning system of claim 1, the relational model being a Markov Logic Network.

3. The imitation learning system of claim 2, the Markov Logic Network comprising a first order logic formula that comprises summations of values corresponding to predicates in atoms of the Markov Logic Network.

4. The imitation learning system of claim 2, the Markov Logic Network comprising a first order logic formula that comprises a mathematic expression that computes a relation between values corresponding to predicates in atoms of the Markov Logic Network.

5. The imitation learning system of claim 1, wherein the existing system is a computer-executable system that comprises a propositional model.

6. The imitation learning system of claim 1, wherein the existing system is a computer-executable system that comprises an agent that is learned by way of reinforcement learning.

7. The imitation learning system of claim 1, wherein the imitation learning system utilizes reinforcement learning and modifies at least one weight in the relational model subsequent to the learner component learning the imitation system.

8. The imitation learning system of claim 1, wherein the existing system receives input data that corresponds to the respective observed states, and wherein the output data is based upon the input data and the observed states.

9. The imitation learning system of claim 8, wherein the imitation system is learned to respond to observed states without contemplating the input data.

10. The imitation learning system of claim 1, wherein the existing system executes at random, wherein outputs of the existing system that are desirable are retained as the output data, wherein states of the existing system that correspond to the output data are retained as the observed states, and wherein the relational learner component learns the imitation system based upon the output data and the observed states.

11. The imitation learning system of claim 1, wherein the imitation system comprises an inferer component that receives data pertaining to an environment in which the imitation system is executing and executes Markov Logic inference over the relational model based at least in part upon the data pertaining to the environment to generate output data.

12. A method, comprising:
 monitoring input/output behavioral characteristics of a computer-executable system, the input/output behavioral characteristics of the computer-executable system comprising output signals generated by the computer-executable system responsive to receipt of respective input signals; and
 learning an imitation system that imitates the input/output behavioral characteristics of the computer-executable system, the imitation system comprising a Markov Logic network that comprises a plurality of formulas and a plurality of edges that represent relationships between respective formulas.

13. The method of claim 12, wherein at least one formula in the formulas comprises summations of values corresponding to predicates in the at least one formula.

14. The method of claim 13, wherein the at least one formula in the formulas further comprises an expression that computes a difference between values corresponding to predicates in the at least one formula.

15. The method of claim 12, wherein the computer-executable system is learned by way of reinforcement learning.

16. The method of claim 12, further comprising utilizing reinforcement learning on the imitation system to update at least one formula in the formulas subsequent to the learning of the imitation system.

17. The method of claim 12, wherein the computer-executable system comprises a propositional model.

18. The method of claim 12, wherein learning the imitation system comprises learning the formulas in the Markov Logic Network.

19. The method of claim 12, wherein the input/output characteristics of the computer-executable system are labeled via observing operation of the computer-executable system and labeling behavior of the computer-executable system that is desirable.

20. A computer-readable medium comprising instructions that, when executed by a processor, cause the processor to perform acts comprising:
 accessing a data repository that comprises data indicative of desirable input/output characteristics of a computer-executable system that is learned via reinforcement learning;
 learning an imitation system that imitates the desirable input/output characteristics of the computer-executable system, the imitation system comprising a Markov Logic Network that comprises a plurality of formulas and edges that represent relationships between respective formulas, at least one formula from amongst the plurality of formulas comprising a mathematical expression corresponding to a count amongst predicates in the formula;
 receiving input data for provision to the imitation system; and
 performing Markov Logic inference over the Markov Logic Network to generate output data responsive to receiving the input data.

* * * * *